United States Patent

Burgdorf et al.

[11] Patent Number: 5,918,948
[45] Date of Patent: Jul. 6, 1999

[54] METHOD OF OPERATING AN ANTI-LOCK AUTOMOTIVE VEHICLE BRAKE SYSTEM

[75] Inventors: Jochen Burgdorf, Offenbach; Dieter Kircher, Bad Vilbel; Johannes Graber, Eschborn; Stefan Drumm, Saulheim, all of Germany

[73] Assignee: ITT Manufacturing Enterprises Inc., Wilmington, Del.

[21] Appl. No.: 08/776,228

[22] PCT Filed: Jul. 8, 1995

[86] PCT No.: PCT/EP95/02664

§ 371 Date: Jun. 12, 1997

§ 102(e) Date: Jun. 12, 1997

[87] PCT Pub. No.: WO96/02409

PCT Pub. Date: Feb. 1, 1996

[30] Foreign Application Priority Data

Jul. 20, 1994 [DE] Germany .............................. 44 25 578

[51] Int. Cl.⁶ ........................................................ B60T 8/34
[52] U.S. Cl. ...................................................... 303/113.2
[58] Field of Search .............................. 303/113.2, 113.3, 303/166, 114.3, 116.1

[56] References Cited

U.S. PATENT DOCUMENTS

| 5,217,284 | 6/1993 | Willmann | 303/113.2 |
|---|---|---|---|
| 5,281,014 | 1/1994 | Volz | 303/116.1 |
| 5,288,142 | 2/1994 | Burgdorf | 303/113.2 |
| 5,335,981 | 8/1994 | Volz et al. | 303/113.3 |
| 5,437,217 | 8/1995 | Castel et al. | 91/369.2 |
| 5,460,074 | 10/1995 | Balz et al. | 91/369.1 |
| 5,496,099 | 3/1996 | Resch | 303/114.1 |
| 5,605,088 | 2/1997 | Balz et al. | 91/369.1 |
| 5,727,852 | 3/1998 | Pueschel et al. | 303/113.4 |

FOREIGN PATENT DOCUMENTS

| 3444827 | 6/1986 | Germany . |
|---|---|---|
| 3800854 | 7/1989 | Germany . |
| 3820657 | 12/1989 | Germany . |
| 3906530 | 9/1990 | Germany . |
| 3910285 | 10/1990 | Germany . |
| 4009640 | 6/1991 | Germany . |
| 4009303 | 9/1991 | Germany . |
| 4010410 | 10/1991 | Germany . |
| 4128091 | 2/1993 | Germany . |
| 4208496 | 8/1993 | Germany . |
| 4232311 | 2/1994 | Germany . |
| 4329140 | 12/1994 | Germany . |
| 406135311 | 5/1994 | Japan ................................. 303/113.2 |
| 2218479 | 11/1989 | United Kingdom . |
| 2242489 | 10/1991 | United Kingdom . |
| 2259122 | 3/1993 | United Kingdom . |

OTHER PUBLICATIONS

German Language International Examination Report for International App. PCT/EP95/02664 filed Jul. 8, 1995.

Search Report of the German Patent Office for Application 4425578.0.

*Primary Examiner*—Robert J. Oberleitner
*Assistant Examiner*—Melanie Talavera
*Attorney, Agent, or Firm*—Rader, Fishman & Grauer PLLC

[57] ABSTRACT

The present invention discloses a method of operating an anti-lock automotive vehicle brake system for driving stability control and/or traction slip control (DSC/TCS) including a brake power booster operable irrespective of the driver's wish. According to this method, the brake power booster is actuated irrespective of the driver's wish for prefilling the vehicle wheel brakes, and further pressure increase in the vehicle wheel brakes upon completion of the prefilling action is carried out by the ABS return pump.

11 Claims, 2 Drawing Sheets

METHOD OF OPERATING AN ANTI-LOCK AUTOMOTIVE VEHICLE BRAKE SYSTEM

BACKGROUND OF THE INVENTION

The present invention relates to a method of operating an anti-lock automotive vehicle brake system for driving stability control and/or traction slip control, including a pneumatic brake power booster operable irrespective of the driver's wish and a master brake cylinder connected downstream of the brake power booster, the pressure chambers of the master brake cylinder being connected to wheel brakes associated with the individual vehicle wheels by way of an ABS hydraulic unit having a return pump.

German patent No. 42 08 496 discloses a brake system, wherein the brake power booster interacts with a solenoid valve to achieve automatically controlled braking operations along with a great deceleration of the vehicle. The solenoid valve permits an enhanced use of the braking pressure upon quick application of the brake pedal. A brake pedal position sensor, a brake light switch and a force sensor permitting detection of the driver's wish for deceleration are provided to achieve the above-mentioned braking pressure control concept. Further, the known brake system includes an anti-lock control system (ABS) which ensures a stable deceleration behavior of the vehicle during braking operations.

However, the patent referred to hereinabove does not provide any specific indications as to how the described brake system could be used for driving stability control.

German patent application No. 42 32 311 discloses a hydraulic vehicle brake system with an anti-lock control device having an auxiliary-pressure source for the improvement of the vehicle directional stability, in particular when cornering, by automatic braking. The auxiliary-pressure source is used to prefill the vehicle wheel brakes and to precharge the return pump. The auxiliary-pressure source, which is provided by parallel connection of an auxiliary pump, a throttle and an auxiliary-pressure limiting valve, is connected to an inlet port of one hydraulic cylinder each. The hydraulic cylinder is connected to the connection between the outlet of an actuating unit, comprised of a brake power booster and a master cylinder inserted downstream of the master cylinder, and the ABS hydraulic unit or the wheel brake. A second inlet of the cylinder is connected to the master brake cylinder, and a separating piston which can be acted upon by auxiliary pressure is guided in the cylinder. The separating piston accommodates a valve which is open in its inactive position and permits a connection between the master brake cylinder and the wheel brake. When the auxiliary pump is started, the separating piston is displaced, with the result that the valve closes the above-mentioned connection and the pressure fluid volume conducted by the separating piston causes prefilling of the wheel brakes and precharging of the return pump.

A disadvantage of this brake system is, however, the comparatively extensive technical effort and structure required to achieve the known method.

SUMMARY OF THE INVENTION

Therefore, an object of the present invention is to disclose a method of operating an anti-lock automotive vehicle brake system of the previously mentioned type which permits being achieved in a simple and low-cost manner by use of component parts which are already provided in the brake system.

A first objective achieved by the present invention involves the actuation of the brake power booster irrespective of the driver's wish upon commencement of the control to prefill the wheel brakes, and the further pressure increase in the wheel brakes is carried out by way of the return pump after completion of the prefilling action.

To measure the hydraulic pressure, introduced by the driver, by way of low-cost pressure sensors, it is favorable that after prefilling of the wheel brakes, the actuation of the brake power booster irrespective of the driver's wish (independent actuation) is deactivated.

In another aspect of the present invention, a favorable supply of the return pump with pressure fluid is achieved because the actuation of the brake power booster irrespective of the driver's wish (independent actuation) is maintained after the prefilling of the wheel brakes. It is advantageous, especially at low temperatures, that aspiration of the pressure fluid from the pressure fluid supply reservoir by way of open central valves, provided in the master brake cylinder, is not required.

In still another aspect of the present invention, the load on the return pump, which is caused during control operations due to the simultaneous actuation by the driver and the independent actuation of the brake power booster, is limited because the actuation of the brake power booster by the driver is sensed and the actuation irrespective of the driver's wish (independent actuation) is reduced accordingly.

To identify the hydraulic pressure introduced by the driver and/or the brake power booster, the hydraulic pressure introduced into the master brake cylinder is continuously determined according to the present invention. To achieve a redundant information about pressure values, the pressure is determined by pressure sensors connected to the pressure chambers of the master brake cylinder according to the present invention. The driver's wish for deceleration may be determined by these values, when the maximum output of the brake power booster is as known.

In a preferred aspect of the present invention, a reliable identification of the driver's wish for deceleration is ensured by sensing the actuating force which is introduced at a pedal actuating the brake power booster.

In another favorable aspect of the present invention, the output pressure of the return pump is limited, preferably to a value recommended for intervention by a car maker.

In still another favorable aspect of the present invention, adequate pressure fluid supply of the return pump is ensured in that the suction side of the return pump can be acted upon by the master brake cylinder pressure.

Further, it is required for the operation that the hydraulic connection between the master brake cylinder and the suction side of the return pump can be opened or closed at any master brake cylinder pressures desired. Preferably, the hydraulic connection is closed only until the pressure fluid volume, which is stored in a low-pressure accumulator connected to the suction side of the return pump, has been conducted to the pressure side of the return pump. It is ensured by this arrangement that the pressure fluid supply of the return pump is not interrupted when the low-pressure accumulator is evacuated.

The second objective achieved by the present invention involves using a volume of pressure fluid, which is stored in a pressure accumulator, for prefilling the wheel brakes upon the commencement of the control.

The dynamics of the above-mentioned pressure control is increased in particular in that the pressure accumulator is connected to the pressure side of the return pump by way of a shut-off valve when the delivery rate of the return pump is not sufficient to perform pressure control operations.

In still another aspect of the present invention, the pressure accumulator is charged when the delivery rate of the return pump is sufficient to simultaneously charge the pressure accumulator and perform the desired pressure control operation, or in the absence of a pressure increase period in any one of the connected wheel brakes. In this arrangement, the charging condition of the pressure accumulator may be monitored by a pressure sensor or a position sensor which determines the position of the pressure accumulator piston, for example.

The present invention will be explained in the following by way of two embodiments, making reference to the accompanying drawings.

DETAILED DESCRIPTION OF THE INVENTION

Figure 1:
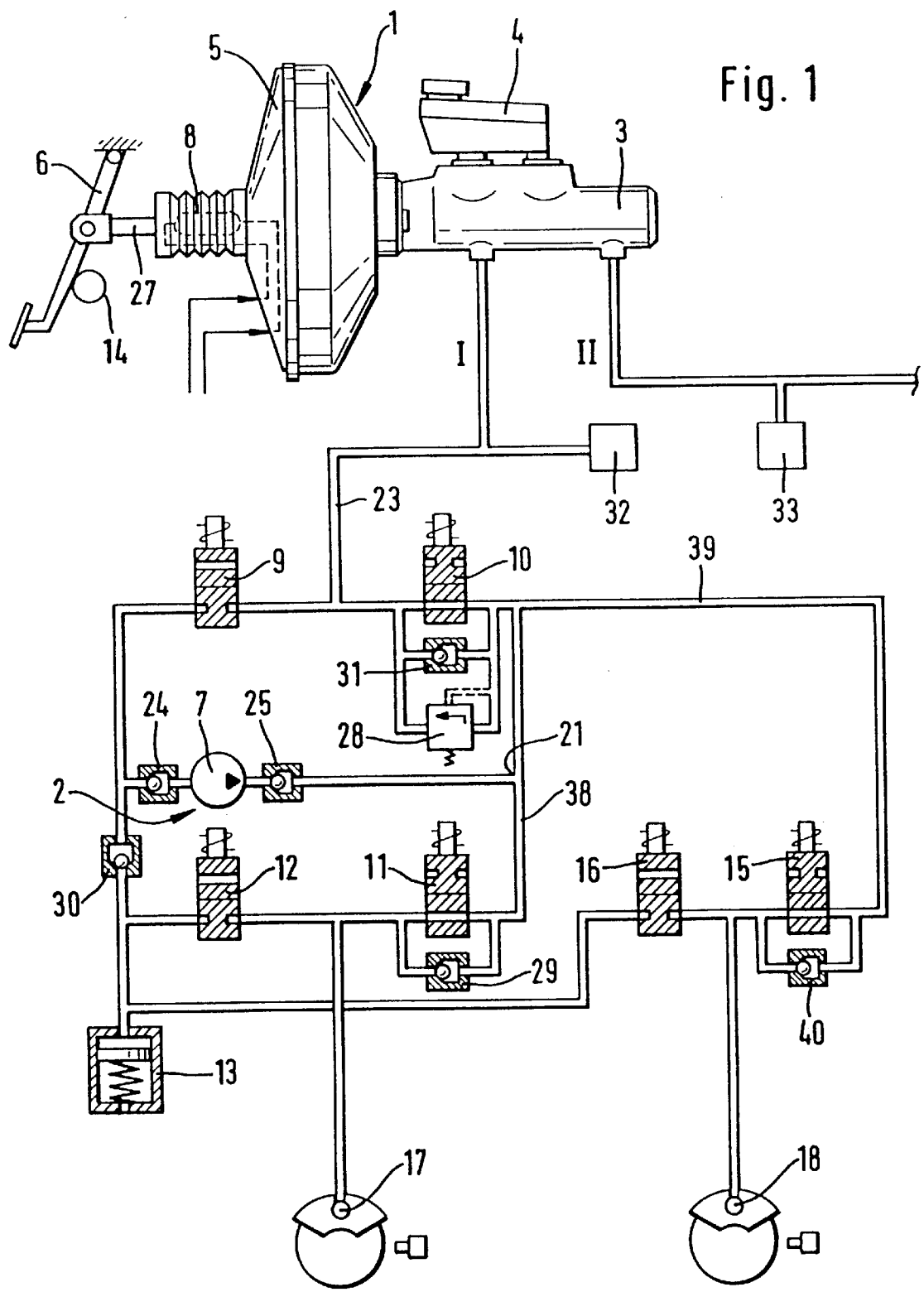
FIG. 1 is a first embodiment of an anti-lock automotive vehicle brake system by which the first solution of the method of the present invention may be realized.

The brake system of the present invention to implement the method of the invention, as shown, includes two brake circuits I and II having a completely identical design. Thus, the following description of one brake circuit also applies to the other brake circuit. The brake system shown generally includes two braking pressure generators 1, 2 which are operable independently of each other and to which wheel brake cylinders 17, 18 are connectable by way of hydraulic lines (not referred to). Further, the brake system includes an electronic control unit with associated sensor means (not shown) The wheel brake cylinders 17, 18 of the individual brake circuits I, II are associated such that the first wheel brake cylinder 17 either is associated with a wheel of one vehicle axle and the other wheel brake cylinder 18 is associated with the diagonally opposite wheel of the other vehicle axle (diagonal split-up of the brake circuits), or both wheel brake cylinders 17 and 18 are associated with the same vehicle axle (black and white split-up of the brake circuits).

The first pressure generator 1 operable by the driver of the automotive vehicle by way of a brake pedal 6 includes a brake power booster 5, which may be a pneumatic booster, for example. A master brake cylinder, preferably a tandem master cylinder 3, is connected downstream of the brake power booster. The pressure chambers (not shown) of the tandem master cylinder are connectable to a pressure fluid supply reservoir 4. An actuating rod 27 is coupled to the brake pedal 6 permitting actuation of a control valve 8 (shown only schematically) which controls the increase of a pneumatic differential pressure in the housing of the vacuum brake power booster 5. A solenoid (not shown), operable by control signals of the electronic control unit, permits an independent actuation of the control valve 8 irrespective of an actuating force introduced at the brake pedal 6.

A brake light switch 14 which is operatively connected to the brake pedal 6 permits identifying the actuation of the brake power booster 5 by the driver or by an independent actuation. The brake pedal 6 is entrained and the brake light switch 14 is thereby reversed during independent actuation of the brake power booster 5. Actuation of the brake power booster 5 initiated by the driver can be detected by use of a release switch (not shown).

The second pressure generator 2 is configured as a motor-and-pump assembly which includes a hydraulic return pump 7 driven by an electric motor (not shown). The suction side of the return pump is connected to the first pressure chamber of the master brake cylinder 3 by a first non-return valve 24 and an electromagnetically operable switching valve 9. The pressure fluid flows from the pressure side of the return pump 7 to a hydraulic junction 21 by way of a second non-return valve 25 and a damping chamber (not shown). A line portion 38 leading to the first wheel brake cylinder 17 and a line portion 39 leading to the second wheel brake cylinder 18 are connected to junction 21. A hydraulic line 23 connects the pressure side of the return pump 7 to the tandem master cylinder 3. Further, a preferably electromagnetically operable separating valve 10 is interposed between the junction 21 and the master brake cylinder 3. A third non-return valve 31 and a pressure-limiting valve 28 are connected in parallel to the separating valve 10. A parallel connection of an inlet valve 11 with a fourth non-return valve 29 and an outlet valve 12 is used for the modulation of the pressure introduced into the first wheel brake cylinder 17. The mentioned parallel connection is provided in the line portion 38, and the outlet valve 12 permits a connection between the first wheel brake cylinder 17 and a low-pressure accumulator 13 for the reduction of the wheel braking pressure. The low-pressure accumulator 13 is connected to the suction side of the return pump 7 by way of a fifth non-return valve 30.

A second parallel connection of a second inlet valve 15 with a sixth non-return valve 40 and a second outlet valve 16 is provided to control the hydraulic pressure introduced into the second wheel brake cylinder 18 associated with the brake circuit at topic, which is similar to the wheel brake cylinder 17 referred to hereinabove. The mentioned parallel connection is arranged in the line portion 39, and the outlet valve 16 provides a connection between the second wheel brake cylinder 18 and the low-pressure accumulator 13 for the reduction of wheel braking pressure.

To identify pressure variations in the tandem master brake cylinder 3 initiated by the driver, a means to determine the master brake cylinder pressures is provided in both brake circuits I, II which, preferably, is configured as pressure sensors 32, 33 connected to the first and the second brake circuits I, II.

During normal braking operations, pressure increase and pressure reduction in the wheel brake cylinders 17, 18 can be effected by a corresponding operation of the first braking pressure generator 1 by way of the open separating valve 10 and the open inlet valves 11, 15.

The return pump 7 is started during ABS control operations in an imminent locked condition of the wheel associated with the wheel brake 17, for example. Both the switching valve 9 and the separating valve 10 remain non-actuated. The pressure is modulated by correspondingly switching the inlet and outlet valves 11 and 12, and the pressure fluid discharged into the low-pressure accumulator 13 is returned by the return pump 7 until the pressure level of the master brake cylinder is reached.

Upon commencement of each independently actuated braking operation, the brake power booster 5 is actuated irrespective of the driver's wish, during the starting period of the return pump 7, so that the wheel brakes 17, 18 are prefilled. The separating valve 10 is closed and the switching valve 9 is opened for further pressure increase. The result is that the return pump 7 generates a high pressure at the junction 21 which is limited by the pressure-limiting valve 28 to permit individual adjustment of the desired independent braking pressure in the wheel brake cylinders 17, 18 by switching the ABS inlet and outlet valves 11, 13 and 12, 16. After switch-over of the valves 9 and 10, actuation of the brake power booster 5 may be reduced to such an extent that the suction side of the return pump 7 is supplied with a still sufficient pressure fluid flow. The pressure prevailing in the master brake cylinder 3, which was adjusted due to simultaneous operation of the brake power booster 5 by the driver and the independent actuation, is monitored continuously by the pressure sensors 32, 33. It may also be expedient to monitor the actuating force introduced by the driver by way of a force sensor.

Pressure is increased by way of the open inlet valve 11. A period in which the pressure is maintained constant is achieved by switch-over of the inlet valve 11, while pressure is reduced by switch-over of the outlet valve 12, when the inlet valve 11 is still closed. The pressure variation required for the control is produced by pressure increase periods, pressure maintain-constant and pressure reduction periods. The pressure fluid discharged into the low-pressure accumulator 13 is returned by the return pump 7. This is done by the switching valve 9 which adopts its closed condition by way of separation of the suction side of the return pump 7 from the master brake cylinder 3 until the low-pressure accumulator 13 is emptied.

Figure 2:
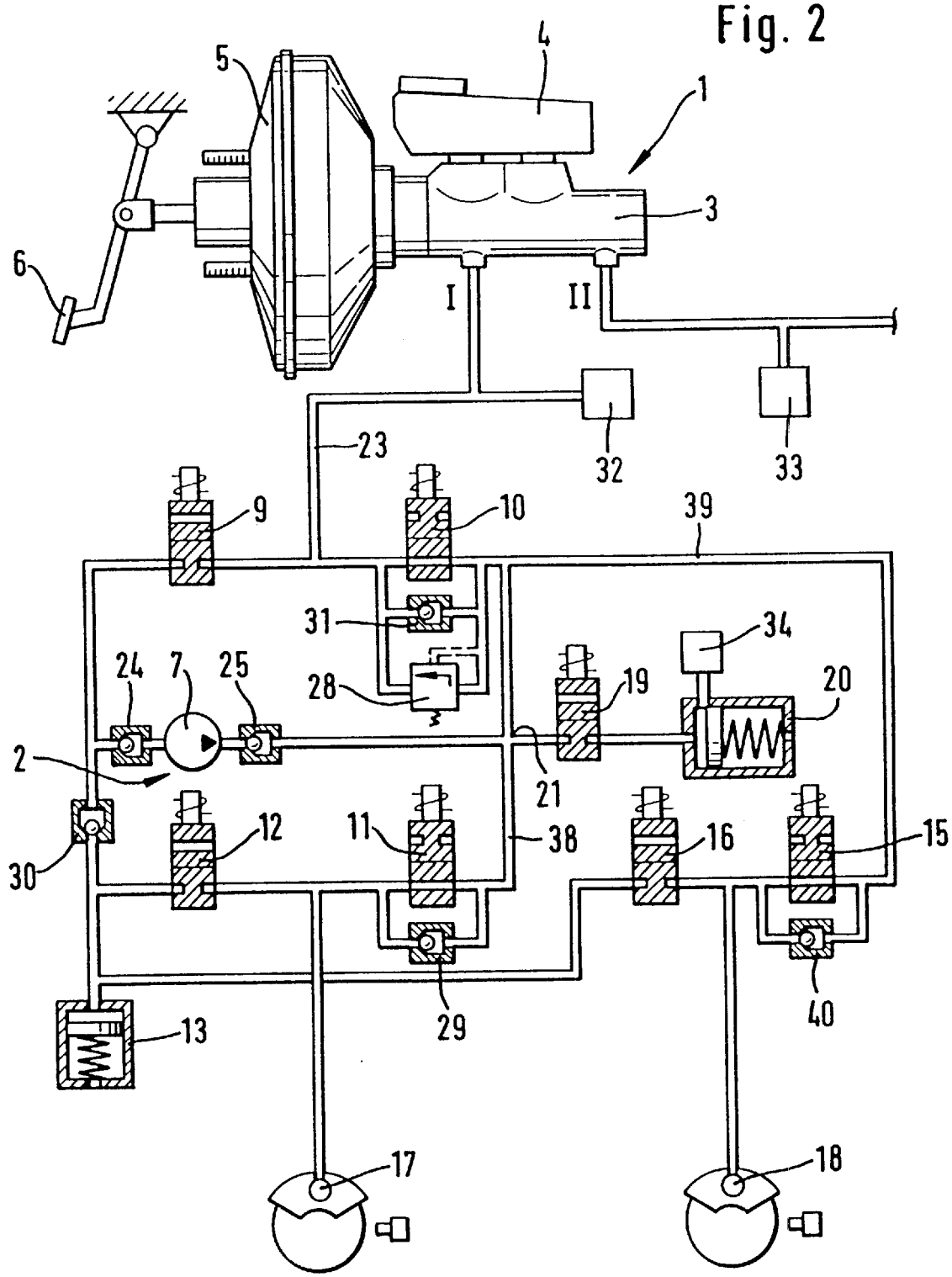
FIG. 2 is a second embodiment of an anti-lock automotive vehicle brake system by which the second solution of the method of the present invention may be realized.

The brake power booster 5 is configured as a known vacuum brake power booster, which is operable only by the brake pedal 6, in the brake system shown in the embodiment of FIG. 2. The design of the brake system corresponds mainly to the brake system previously described with respect to the embodiment of FIG. 1. In the embodiment of FIG. 2, a hydraulic pressure accumulator 20 is connected to the hydraulic junction 21 by the intermediary of a shut-off valve 19. The charging condition of the pressure accumulator 20 is monitored by a pressure or travel sensor 34.

The wheel brakes 17, 18 in the brake system shown in FIG. 2 are prefilled during the starting period of the return pump 7 by opening the shut-off valve 19, with the result that the pressure fluid volume stored in the pressure accumulator 20 becomes available. When the electronic control unit (not shown) detects that the fluid flow through the shut-off valve 19 changes its direction to the effect of charging the pressure accumulator 20, the entire pump fluid volume is supplied for further pressure increase to the wheel brakes 17, 18 by closure of the shut-off valve 19.

As soon as the running return pump 7 has reached its nominal delivery rate, or in the absence of need of pressure increase in any one of the wheel brakes 17, 18, the shut-off valve 19 may be re-opened to permit recharge of the pressure accumulator 20.

We claim:

1. A method of operating an anti-lock automotive vehicle brake system for driving stability control and/or traction slip control, including a pneumatic brake power booster operable irrespective of the driver's wish and a master brake cylinder connected downstream of the brake power booster, wherein the pressure chambers of the master brake cylinder are connected to wheel brakes associated with the individual vehicle wheels by way of an ABS hydraulic unit having a separating valve in each connection between the master brake cylinder and the wheel brakes and a return, whereby, upon commencement of the driving stability control and/or traction slip control, the brake power booster is actuated irrespective of the driver's wish for prefilling the wheel brakes, characterized in that, after prefilling the wheel brakes, each connection between the master brake cylinder and the wheel brakes is closed by means of the respective separating valve, and the further pressure increase in the wheel brakes is carried out by way of the return pump.

2. The method as claimed in claim 1, characterized in that, after prefilling of the wheel brakes, the actuation of the brake power booster irrespective of the driver's wish is deactivated.

3. The method as claimed in claim 1, characterized in that, after prefilling of the wheel brakes, the actuation of the brake power booster irrespective of the driver's wish is maintained.

4. The method as claimed in claim 1, characterized in that the actuation of the brake power booster by the driver is sensed, and the actuation irrespective of the driver's wish is reduced accordingly.

5. The method as claimed in claim 1, characterized in that the hydraulic pressure introduced into the master brake cylinder is determined continuously.

6. The method as claimed in claim 5, characterized in that the pressure is determined by pressure sensors connected to the pressure chambers of the master brake cylinder.

7. The method as claimed claim 1, characterized in that the actuating force which is introduced by a pedal actuating the brake power booster is sensed.

8. The method as claimed in claim 1, characterized in that the output pressure of the return pump is limited.

9. The method as claimed in claim 3, characterized in that the suction side of the return pump can be acted upon by the master brake cylinder pressure.

10. The method as claimed in claim 9, characterized in that the hydraulic connection between the master brake cylinder and the suction side of the return pump is opened or closed at any master brake cylinder pressures desired.

11. The method as claimed in claim 10, characterized in that the hydraulic connection between the master brake cylinder and the suction side of the return pump is closed only until the pressure fluid volume, which is stored in a low-pressure accumulator connected to the suction side of the return, has been conducted to the pressure side of the return pump.

* * * * *